H. HINCKLEY & N. H. CULVER.
Velocipede.

No. 213,109. Patented Mar. 11, 1879.

UNITED STATES PATENT OFFICE.

HERMON HINCKLEY AND NEWTON H. CULVER, OF WILLIAMSPORT, PA.

IMPROVEMENT IN VELOCIPEDES.

Specification forming part of Letters Patent No. 213,109, dated March 11, 1879; application filed July 25, 1878.

*To all whom it may concern:*

Be it known that we, HERMON HINCKLEY and NEWTON H. CULVER, of Williamsport, in the county of Lycoming and State of Pennsylvania, have invented a new and useful Improvement in Velocipedes; and we do hereby declare that the following is a full and exact description of the same, reference being had to the accompanying drawings, and to the letters of reference marked thereon.

The object we have in view is the production of a simple three-wheel velocipede, which can be used both by male and female riders, can be operated easily with good effect as an exercise, and steered readily; and our invention therein consists in the peculiar steering devices and in the combination of the principal operative parts of our velocipede, all as fully hereinafter explained.

Figure 1:
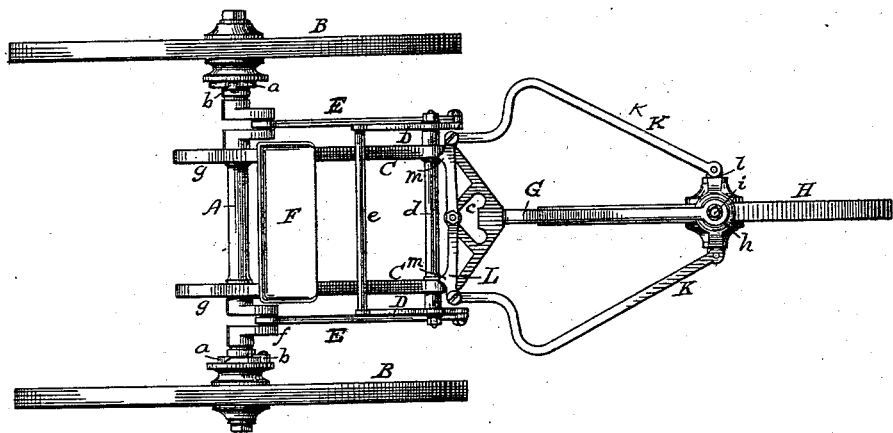
Figure 2:
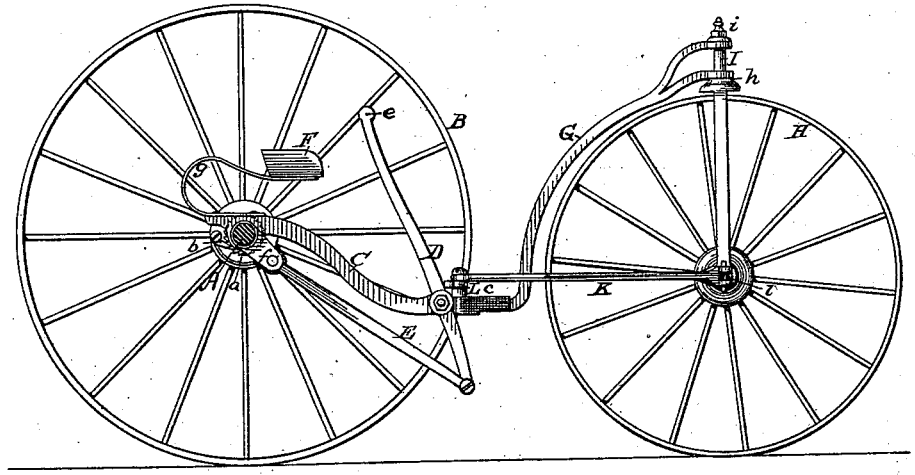

In the drawings, Figure 1 is a top view of the velocipede complete, and Fig. 2 a side elevation with the nearest driving-wheel removed.

The driving-axle A is supported upon two wheels, B. These wheels are connected to turn in one direction with the axle by ratchets $a$ on the axle and spring-pawls $b$ pivoted to disks on the inner sides of the hubs. The pawls and ratchets allow for the unequal travel of the wheels in turning.

The axle turns in and supports the side pieces, C, of the frame to the velocipede, which are bent downwardly and extended forward the proper distance and connected together at their front ends by an open cross-frame, $c$, which is supported by the steering-wheel.

Just to the rear of the cross-frame $c$ the side pieces, C, are connected together by a round bar, $d$, which extends outside of such side pieces. On each end of the bar $d$ is pivoted a lever, D, extending both above and below such bar. The upper ends of the levers D are joined by a hand-bar, $e$, and from their lower ends pitman-rods E extend rearwardly to cranks $f$ on the axle A, just outside of the side pieces, C. These cranks project in the same direction from the axle, so that the levers D will work together.

The seat F is supported a little in front of the axle on suitably-bent springs $g$, rising from the side pieces.

In use, the rider sits upon the spring-seat F, with his feet firmly braced against the pivoted steering-lever. He grasps the bar $e$ with both hands, pulling and pushing the levers back and forth and driving the velocipede. The motion is similar to that of rowing, and is good exercise for either sex.

From the center of the cross-frame $c$ rises a curved bar, G, to sufficient height to allow the steering-wheel H to swing under it. The forward end of the bar G is forked, as shown, and through these forked ends the upper end of the standard I passes. The lower end of the bar G rests upon a shoulder, $h$, of the standard I, and above this shoulder the standard is rounded, and turns in the ends of the bar G, and is held thereto by a nut, $i$, turned on the upper end of the standard.

Below the shoulder $h$ the standard I is forked, and its lower ends sleeved on the short axle $l$ of the steering-wheel. To each end of the axle $l$, outside of the standard I, is pivoted the forward end of a horizontal bar, K, which bars K extend backward, and are pivoted to the ends of a horizontal foot-lever, L, pivoted at its center to the frame $c$, just in front of and above the bar $d$.

The side bars, K, spread outwardly from the steering-wheel on straight lines, as shown, so as to allow such wheel sufficient room to swing between them, and are then bent inwardly to the ends of the pivoted lever L.

The feet of the rider rest against the lever L near its ends. The equal pressure upon both feet, caused by the motion used in driving the velocipede, keeps the steering-wheel straight, and by pressing forward either foot the steering-wheel is easily turned.

The lever L has rearward projections, $m$, near its ends, to prevent the feet from slipping outwardly on the lever when pushing it forward on either side. The forked forward end of the bar G braces and holds the standard I, so that it cannot twist sidewise.

Both the driving and steering mechanisms are very simple and effective, and are peculiarly adapted to each other, the equal forward pressure of the body caused by the effort of driving the velocipede tending to keep the steering-wheel straight.

What we claim as our invention is—

1. The combination, with the steering-wheel H and forked standard I, of the spreading side bars, K, pivoted to the ends of the axle of the said wheel, outside of such wheel, and the centrally-pivoted lever L, constructed and arranged substantially as described and shown.

2. A velocipede wherein are combined the revolving axle A, having cranks $f$ pointing in the same direction, the pitman-rods E, the levers D, working together back and forth, and connected at their upper ends by a hand-bar, the centrally-pivoted foot-lever L, the spreading side bars, K, and the steering-wheel H, all constructed and arranged to operate substantially as described and shown.

This specification signed and witnessed this 15th day of July, 1878.

HERMON HINCKLEY.
NEWTON H. CULVER.

Witnesses:
E. C. TAYLOR,
H. E. TAYLOR.